United States Patent
Suhara

(10) Patent No.: US 6,555,810 B1
(45) Date of Patent: Apr. 29, 2003

(54) OPTICAL SCANNING DEVICE COMPRISING A PLURALITY OF SCANNING UNITS HAVING ONE LENS IN COMMON

(75) Inventor: Hiroyuki Suhara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 37 days.

(21) Appl. No.: 09/666,473

(22) Filed: Sep. 20, 2000

(30) Foreign Application Priority Data

Sep. 22, 1999 (JP) .......................................... 11-269230

(51) Int. Cl.[7] .............................. H01J 3/14; H01J 40/14; H01J 5/16
(52) U.S. Cl. ...................... 250/234; 250/235; 250/236; 359/197; 359/201; 359/206; 359/216
(58) Field of Search ................................ 250/234, 235, 250/236; 347/241, 244, 256, 258; 359/201, 203, 204, 206, 197, 216

(56) References Cited

U.S. PATENT DOCUMENTS

| 5,300,962 | A | * | 4/1994 | Genovese | 346/108 |
| 5,834,766 | A | | 11/1998 | Suhara | 250/234 |
| 5,838,355 | A | * | 11/1998 | Narayan et al. | 347/115 |
| 6,081,386 | A | | 6/2000 | Hayashi et al. | 359/641 |
| 6,201,561 | B1 | * | 3/2001 | Ichikawa | 347/241 |
| 6,239,828 | B1 | * | 5/2001 | Ito et al. | 347/241 |
| 6,292,285 | B1 | * | 9/2001 | Wang et al. | 359/204 |

FOREIGN PATENT DOCUMENTS

| JP | 61-11720 | | 1/1986 |
| JP | 10-68899 | | 3/1998 |
| JP | 10068899 | A * | 10/1998 |

* cited by examiner

Primary Examiner—Stephone B. Allen
Assistant Examiner—Christopher W. Glass
(74) Attorney, Agent, or Firm—Oblon, Spivak, McClelland, Maier & Neustadt, P.C.

(57) ABSTRACT

An optical scanning device includes a plurality of optical scanning units each including a light source emitting a light flux, a scanning input optical system directing the light flux emitted from the light source to a deflector. The deflector deflects the light flux so as to cause the light flux to scan a surface to be scanned. A scanning and imaging optical system condenses the light flux deflected by the deflector so as to form a beam spot thereof on the surface to be scanned. The optical scanning device scans the surface to be scanned continuously through coordinated movements of the plurality of optical scanning units, and the respective scanning and imaging optical systems of adjacent at least two of the plurality of optical scanning units have one lens in common.

19 Claims, 13 Drawing Sheets

OPTICAL SCANNING DEVICE COMPRISING A PLURALITY OF SCANNING UNITS HAVING ONE LENS IN COMMON

BACKGROUND OF THE INVENTION

1. Field of the Invention

The present invention generally relates to an optical scanning device employed in an optical writing unit of a laser printer, a laser copier or the like, and deflecting a laser light emitted from a laser light source and thus scanning a surface to be scanned while forming a beam spot on the surface to be scanned, and, in particular, an optical scanning device employing a plurality of optical scanning units each including a light source, a first optical system, a deflector and a second optical system, and continuously scanning one surface to be scanned through coordinated movements of the respective optical scanning units.

2. Description of the Related Art

Recently, high density writing, high-speed writing and miniaturization are demanded for laser printers, laser copiers and so forth. Accordingly, for optical scanning devices which occupy a large space from a laser light source to a surface to be scanned, it is demanded to deal with high density writing, high-speed writing and miniaturization.

However, an optical scanning device, such as for example including a single laser light source which emits a light flux and a single deflector which deflects the light flux a surface to be scanned is scanned (raster-scanned) by means of a beam spot, and the optical scanning device needs to deflect the light flux extending from a deflector to the surface to be scanned through a wide range of the surface to be scanned. Because there is a limit to the angle by which the light flux extending from the deflector to the surface to be scanned is deflected for scanning, long distance is needed between the deflect and surface to be scanned. Thus, a large is needed in the optical scanning device. Accordingly, it is difficult to miniaturize the optical scanning device.

Further, it is necessary to reduce the diameter of a beam spot to deal with high-density writing. For this purpose, it is necessary to design the optical system subsequent to the deflector to have a small focal length. Also from this point, it is difficult to achieve high-density writing using a single laser light source and a single deflector.

An optical scanning device in the related art will now be described with reference to a figure.

FIG. 1 shows a configuration of the optical scanning device in the related art.

As shown in the figure, the optical scanning device 100 includes a light source 1 such as for example a semiconductor laser which emits a divergent laser light flux, a coupling lens 2 which is for example a collimator lens to transform the divergent light flux emitted from the light source 1 into an approximately parallel light flux, a stop 3 which reduces the diameter of the light flux made to be approximately parallel by the coupling lens 2 and cuts an unnecessary flux portion, a line-image forming optical system 4 which, as a cylindrical lens for example, has a refracting power in sub-scanning direction, and a mirror 5 which bends the light path of the light flux exiting from the line-image forming optical system 4 by reflecting it and thereby directs it to a deflection reflective surface 6a of a deflector 6. The deflector 6 deflects in a main scanning direction the light flux so as to become like a line, long in the main scanning direction by the line-image forming optical system 4 and incident on the deflection reflective surface 6a by rotating the deflector at a uniform angular velocity. An fθ lens 7 corrects the light path of the light flux deflected by the deflector 6 for linearly scanning a photosensitive body 9. A long-dimensional lens 8 corrects the surface inclination of the light flux occurring from the deflection reflective surface 6a. For example, when photosensitive body 9, which is a surface to be scanned, is scanned by a beam spot formed of the deflected light flux, a synchronization detecting sensor 12 is used for establishing synchronization between the light flux emitted from the light source 1 and the rotation angle of the deflector 6 based on the incident light flux.

The light source 1, coupling lens 2, stop 3, line-image forming optical system 4 and mirror 5 constitute a scanning input optical system 15. Further, the fθ lens 7 and long-dimensional lens 8 constitute a scanning and imaging optical system 18.

The optical scanning device 100 shown in FIG. 1 operates as follows:

A divergent light flux 20 emitted from the light source 1 is transformed into an approximately parallel light flux 20a by the coupling lens 2, has an unnecessary light flux portion thereof cut by the stop 3, is condensed in sub-scanning direction by the line-image forming optical system 4, is reflected by the mirror 5, and, thus, is incident on the deflection reflective surface 6a of the deflector 6 becoming like a line long in.main scanning direction.

The deflector 6 rotates at the uniform angular velocity in direction of arrow 30, and the entrance angle and exit angle of the incident light flux 20a with respect to the deflection reflective surface 6a change with the rotation of the deflector 6. Accordingly, the incident light flux 20a exits therefrom as the light flux 20b→20c→20d in the stated order as a result of being deflected by the deflection reflective surface 6a in main scanning direction according to the rotation of the deflector 6.

Each light flux 20b, 20c, 20d exiting from the deflector 6 has the light path thereof corrected by the fθ lens 7 so as to scan the photosensitive body 9 linearly in direction indicated by arrow 50, and has the surface inclination of the deflection reflective surface 6a corrected by the long-dimensional lens 8.

Each light flux 20b, 20c, 20d corrected by the fθ lens 7 and the long-dimensional lens 8 forms a beam spot on the-photosensitive body 9.

The synchronization detecting sensor 12 detects, for example, the light flux 20e exiting from the deflector 6, compares the timing of the thus detected light flux with the timing of the predetermined light flux emitted from the light source 1, and eliminates the difference therebetween. Thereby, synchronizes the rotational angle of the deflector 6 with the light flux emitted from the light source 1.

In order to miniaturize an optical scanning device such as that 100 shown in FIG. 1, for example, as disclosed in Japanese Laid-Open Patent Application No. 61-11720, two deflectors are used, thereby a scanning length to be scanned by each deflector is reduced, and miniaturization is achieved.

However, in such a method, as a result of two deflectors being employed, it is important to secure continuity between light fluxes (scanning laser beams) exiting from the respective deflectors, precisely. However, Japanese Laid-Open Patent Application No. 61-11720 does not clearly disclose how to secure continuity between the light fluxes precisely.

On the other hand, Japanese Laid-Open Patent Application No. 10-68899, for example, discloses a method in that two sets of deflectors and optical components for the respective deflectors are disposed stepwise, and, also, light fluxes from the respective deflators are made to be continuos by a beam splitter, and, thereby, continuity between the light fluxes is precisely secured.

However, in such a method, a beam splitter is needed as an extra component, and, also, a high level of position adjustment technology and so forth are needed for securing continuity between light fluxes from respective sets of deflectors and optical components disposed stepwise through the beam splitter.

Accordingly, it is difficult to actually manufacture it.

Further, in order to further miniaturize an optical scanning device, it is necessary to secure continuity between light fluxes from respective ones of more than two sets of deflectors and optical components through a beam splitter. However, it is further difficult to actually manufacture it because a further high level of position adjustment technology is needed.

SUMMARY OF THE INVENTION

The present invention has been devised in order to solve the above-described problems, and, an object of the present invention is to provide an optical scanning device for which miniaturization is easy, and, also, adjustment and so forth needed manufacturing it are easy.

An optical scanning device according to the present invention comprises:

a plurality of optical scanning units each comprising:

a light source emitting a light flux;

a scanning input optical system directing the light flux emitted from the light flux to a deflector;

the deflector deflecting the light flux for causing the light flux to scan a surface to be scanned; and a scanning and imaging optical system condensing the light flux deflected by the deflector so as to form a beam spot thereof on the surface to be scanned, wherein:

the optical scanning device scans the surface to be scanned continuously through coordinated movements of the plurality of optical scanning units; and the respective scanning and imaging optical systems of adjacent at least two of the plurality of optical scanning units have one lens in common.

In this configuration, the optical scanning device employs the plurality of optical scanning units. Accordingly, it is possible to miniaturize the device. Further, because the lens is provided which the respective optical scanning units have in common, it is possible to provide the optical scanning device for which adjustment and so forth in manufacturing is easy.

The lens which the respective scanning and imaging optical systems have in common may comprise a plastic lens. Thereby, it is easy to form aspherical surfaces and/or free curved surfaces on the lens, and it is possible to provide inexpensive optical scanning device.

An optical scanning device according to another aspect of the present invention comprising:

a plurality of optical scanning units each comprises:

a light source emitting a light flux;

a scanning input optical system directing the light flux emitted from the light flux to a deflector;

the deflector deflecting the light flux for causing the light flux to scan a surface to be scanned; and a scanning and imaging optical system condensing the light flux deflected by the deflector so as to form a beam spot thereof on the surface to be scanned, wherein:

the optical scanning device scans the surface to be scanned continuously through coordinated movements of the plurality of optical scanning units; and in order to reduce a difference between a diameter of a beam spot at a scanning end position of an optical scanning unit of the plurality of optical scanning units scanning the surface to be scanned and a diameter of a beam spot at a scanning beginning position of another optical scanning unit of the plurality of optical scanning units scanning the surface to be scanned subsequently, the respective scanning and imaging optical systems of the plurality of optical scanning units satisfy the following expression (1):

$$(Bn(-) - <B>) \times (Bn+1(+) - <B>) \geq 0 \qquad (1)$$

where:

m: the total number of the plurality of optical scanning units;

n: any integer in the range of $1 \leq n \leq m-1$;

$Bn(-)$: a diameter of beam spot at the scanning end position of an n-th optical scanning unit of the plurality of optical scanning units;

$Bn+1(+)$: a diameter of beam spot at the scanning beginning position of an (n+1)-th optical scanning unit of the plurality of optical scanning units; and $<B>$: an average of diameters of beam-spots of the plurality of optical scanning units scanning the surface to be scanned.

In this configuration, the optical characteristics at joined portions of the respective optical scanning units are approximated by one another. Thereby, the optical scanning device is not likely to generate lines of density difference and/or the like at the joined portions only as a result of the microprocessor or the like precisely controlling switching of the outputs of the respective optical scanning units.

The scanning and imaging optical system may be approximately telecentric in main scanning direction. Thereby, shifts otherwise occurring at the joins with change in position on the photosensitive body do not occur.

An optical scanning device according to another aspect of the present invention comprises:

a plurality of optical scanning units each comprising:

a light source emitting a light flux;

a scanning input optical system directing the light flux emitted from the light flux to a deflector;

the deflector deflecting the light flux for causing the light flux to scan a surface to be scanned; and a scanning and imaging optical system condensing the light flux deflected by the deflector so as to form a beam spot thereof on the surface to be scanned, wherein:

the optical scanning device scans the surface to be scanned continuously through coordinated movements of the plurality of optical scanning units; and a synchronization detecting light path for at least one optical scanning unit of the plurality of optical scanning units is provided between light paths of the respective scanning and imaging optical systems of adjacent two optical scanning units of the plurality of optical scanning units, and, also, a light directing part directing a light flux of the synchronization detecting light path to the outside of the light paths of the respective scanning and imaging optical systems is provided there.

In this configuration, even when more than two deflectors are used, it is possible to detect synchronization of the deflectors precisely.

When the synchronization detecting light path comprises a plurality of synchronization detecting light paths, the single light directing part may direct the plurality of synchronization detecting light paths. In this configuration, the synchronization detecting part may be used in common. Thereby, it is possible to save the space, to improve the space utilization efficiency, to reduce the influence of variation in characteristics of a plurality of synchronization detecting sensors, and to reduce the costs by reducing the number of synchronization detecting sensors.

An optical scanning device according to another aspect of the present invention comprises:

a plurality of optical scanning units each comprising:

a light source emitting a light flux;

a scanning input optical system directing the light flux emitted from the light flux to a deflector;

the deflector deflecting the light flux for causing the light flux to scan a surface to be scanned; and a scanning and imaging optical system condensing the light flux deflected by the deflector so as to form a beam spot thereof on the surface to be scanned, wherein:

the optical scanning device scans the surface to be scanned continuously through coordinated movements of the plurality of optical scanning units; and a synchronization detecting light path for at least one optical scanning unit of the plurality of optical scanning units is provided between light paths of the respective scanning and imaging optical systems of adjacent two optical scanning units of the plurality of optical scanning units, and, also, a synchronization detecting part detecting a light flux of the synchronization detecting light path is provided there.

Also in this configuration, even when more than two deflectors are used, it is possible to detect synchronization of the deflectors precisely.

When the synchronization detecting light path comprises a plurality of synchronization detecting light paths, the single synchronization detecting part may detect light fluxes of the plurality of synchronization detecting light paths. Also in this configuration, the synchronization detecting part is used in common. Accordingly, it is possible to save the space, to improve the space utilization efficiency, to reduce the influence of variation in characteristics of a plurality of synchronization detecting sensors, and to reduce the costs by reducing the number of synchronization detecting sensors.

Further, as a result of the above-described features of the present invention being combined, it is possible to miniaturize the optical scanning device, to prevent density difference from occurring in the joints of the respective optical scanning units, and to establish synchronization of the deflectors precisely, in the optical scanning device.

Other objects and further features of the present invention will become more apparent from the following detailed description when read in conjunction with the accompanying drawings.

DETAILED DESCRIPTION OF THE PREFERRED EMBODIMENTS

Preferred embodiments of the present invention will now be described with reference to figures.

Figure 1:
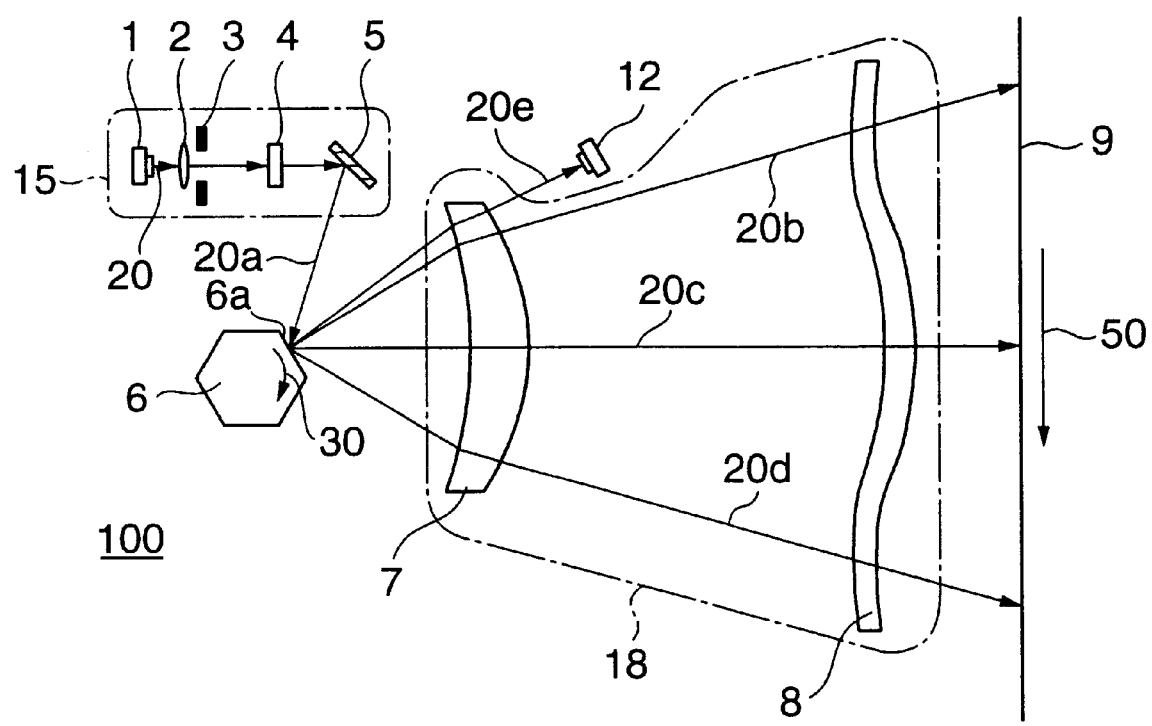
FIG. 1 shows a configuration of an optical scanning device in the related art.

In FIGS. 2 through 13, the same reference numerals are given to components having the same functions as those of the components shown in FIG. 1, and the duplicated description is omitted.

Figure 2:
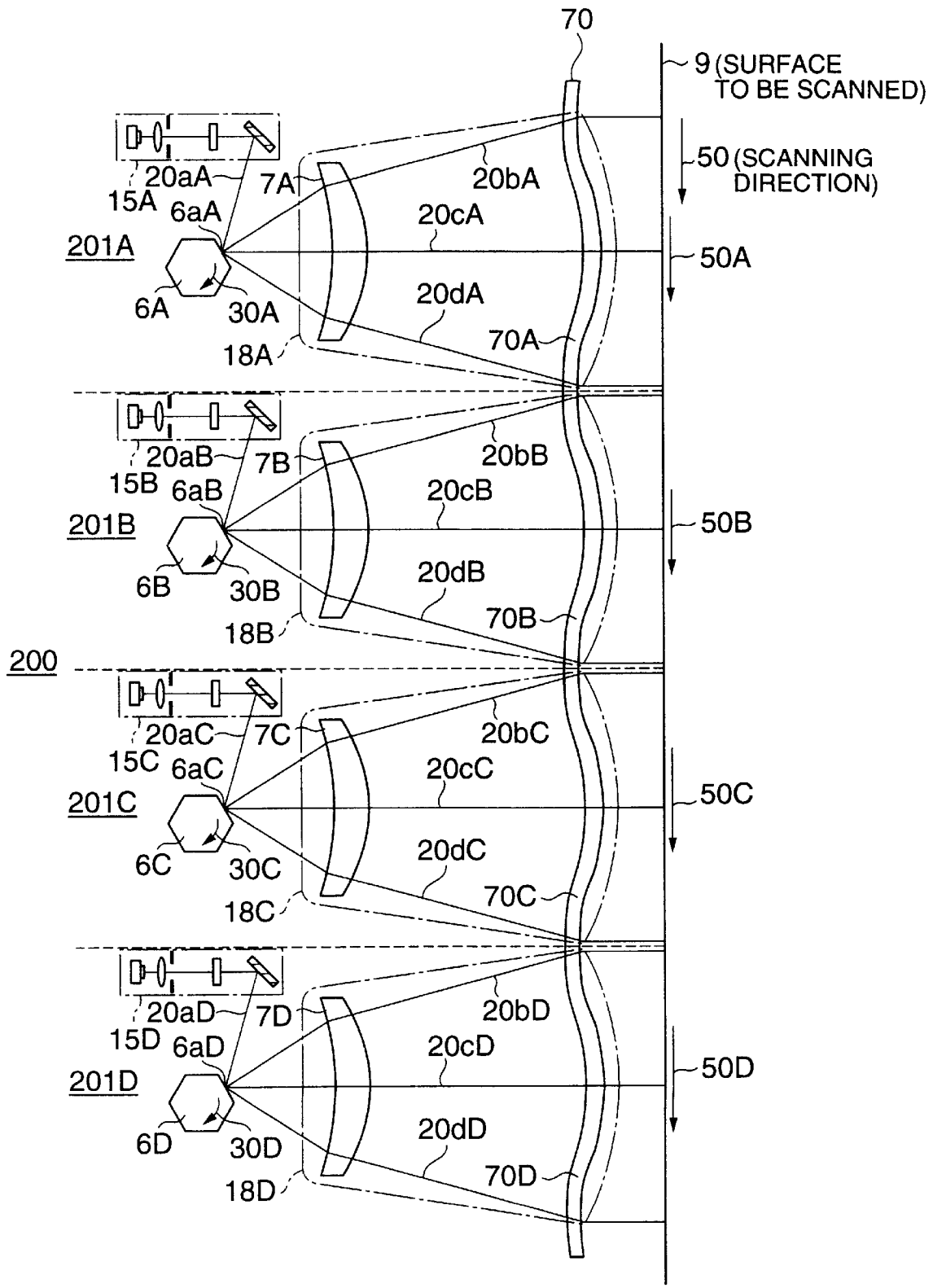
FIG. 2 shows a configuration of an optical scanning device in a first embodiment of the present invention.

FIG. 2 shows an optical scanning device in a first embodiment of the present invention.

Further, each of the optical scanning units 201A through 201D has the same components as those of the configuration of the optical scanning device 100 in the related art shown in FIG. 1. For these same components in FIG. 2, letters A through D corresponding to the respective optical scanning units 201A through 201D are added immediately subsequent to the same reference numerals as those used in FIG. 1, and the duplicated description is omitted.

Further, although the scanning and imaging optical system 18 of the optical scanning device 100 shown in FIG. 1 is a non-telecentric optical system, scanning and imaging optical systems 18A through 18D of the respective optical scanning units 201A through 201D are approximately telecentric optical system.

It is noted that the telecentric optical system is an optical system which causes a scanning light flux 20 to be incident on a surface to be scanned 9 at a right angle (90°) and form an image thereon. However, in the first embodiment, the scanning.and imaging optical systems 18A thorough 18D may be optical systems each of which causes a scanning light flux to be incident on the surface to be scanned 9 at an approximately right angle (not precisely 90° but may be one in a range of 80° through 90°) and form an image thereon. Accordingly, the scanning and imaging optical systems 18A through 18D are expressed as approximately telecentric optical systems.

Further, each of the optical scanning units 201A through 201D has the same components as those of the configuration of the optical scanning device 100 in the related art shown in FIG. 1. For these same components in FIG. 2, alphabets A through D corresponding to the respective optical scanning units 201A through 201D are added immediately subsequent to the same reference numerals as those used in FIG. 1, and the duplicated description is omitted.

Further, in the first embodiment, the respective optical scanning units 201A through 201D are controlled by a micro processor or the like not shown in the figure, thereby, coordinated movements thereof are achieved, and, as a result, scanning is performed continuously on the single surface to be scanned 9 by them.

Although each of the rotation directions 30A through 30D of the respective deflectors 6A through 6D of the optical scanning units 201A through 201D may be individually determined to be either clockwise or counterclockwise direction, it is assumed that the respective rotation directions 30A through 30D are all the clockwise direction, for the sake of simplification of description. Thereby, the respective scanning directions 50A through 50D of the optical scanning units 201A through 201D are all the downward direction as shown in FIG. 2, and, the scanning direction 50 of the entirety of the optical scanning device 200 is the downward direction as shown in the figure.

The reason why each of the scanning and imaging optical systems 18A through 18D of the first embodiment is different from the scanning and imaging optical system 18 shown in FIG. 1 and is of an approximately telecentric optical system is to minimize shift amounts at the joined portion occurring with a change in position on the photosensitive body.

In the case of approximately telecentric optical systems as shown in FIG. 2, there is no space between adjacent light fluxes 20b and 20d of the respective optical scanning units 201A through 201D scanning the surface 9 to be scanned, and it is necessary to form the long-dimensional lenses 70A through 70D in such a manner that there is no space between adjacent long-dimensional lenses.

For example, if the long-dimensional lenses 70A through 70D are provided separately, it is necessary to make a design so that each long-dimensional lens 70A through 70D has a length longer than the effective length by which the light flux 20 scans the surface 9 to be scanned, in consideration of manufacturing error, assembling error and so forth of each lens. However, when the long-dimensional lenses 70A through 70D are formed integrally as in the embodiment, the length of each long-dimensional lens 70A through 70D naturally coincides with the effective length by which the light flux 20 scans the surface 9 to be scanned, and no assembling error between the respective lenses is generated. Accordingly, no extra lens portion is needed.

Accordingly, when the optical systems are approximately telecentric, it is preferable that the long-dimensional lenses 70A through 70D are formed integrally according to the first embodiment.

In FIG. 2, it is expressed that there is a space between the scanning end position (position at which an image is formed of the light flux 20d) of the optical scanning unit 201A and the scanning beginning position (position at which an image is formed of the light flux 20b) of the optical scanning unit 201B so that they are not continuous, for example. However, this expression is made for clearly showing the scanning end position of the optical scanning unit 201A and scanning beginning position of the optical scanning unit 201D. Actually, the surface 9 to be scanned is scanned by the optical scanning units 201A through 201D continuously without a gap.

Further, when each optical scanning unit 201A through 201D is made to be a nontelecentric optical system, there is a space in the long-dimensional lens 70 at position between adjacent light flux 20d of which an image is formed on the surface 9 to be scanned at the scanning end position and light flux 20b of which an image is formed on the surface 9 to be scanned at the scanning beginning position. Accordingly, it is not necessary to dispose the long-dimensional lenses 70A through 70D without a space therebetween as in the case of approximately telecentric optical systems. In this case, a lens obtained from only connecting the two long dimensional lenses 70A and 70B of the optical scanning units 201A and 201B, or a lens obtained from only connecting the two long-dimensional lenses 70C and 70D of the optical scanning units 201C and 201D may be configured, for example.

As a method of configuring the lens 70 obtained from connecting the long-dimensional lenses 70A through 70D, there is a method in that the lens 70 is formed of a plastic lens molded from such a plastic material that it is easy to form curved surfaces. Since the long-dimensional lenses 70A through 70D are aspherical lenses, the surfaces of the lens 70 obtained from connecting them are very complicated curved surfaces, and, therefore, it is very difficult to form the aspherical lens 70 of a glass material in consideration of process of grinding and so forth.

Further, although the fθ lenses 7A through 7D are individual lenses in the first embodiment as shown in FIG. 2, it is also possible to form a single lens by connecting the fθ lenses 7A through 7D similarly to the lens 70, for example.

As described above, in the first embodiment, the plurality of (four) optical scanning units are used, and, also, the respective scanning and imaging optical systems 18A through 18D of adjacent at least two optical scanning units have the single lens (70, and/or a lens obtained as a result of the lenses 7A through 7D being connected) in common. Thereby, it is possible to miniaturize the optical scanning device, and, also, to make easier the adjustment work in manufacturing it.

Further, in the first embodiment, as described above, the long-dimensional lenses 70A through 70D of the respective optical scanning units 201A through 201D are formed to be the single lens 70. Thereby, even when the optical systems are approximately telecentric optical systems, it is possible for the optical scanning device to scan the surface 9 to be scanned continuously by the optical scanning units 201A through 201D. However, when the diameter of beam spot is different for each of the respective optical scanning units 201A through 201D, the diameter of beam spot suddenly changes at the join of the light fluxes 20d and 20b of adjacent optical scanning units. Thereby, density difference occurs, and, as a result, the density may become discontinuous.

In order to solve this problem, it is preferably to make the diameters of beam spots at adjacent scanning end position and scanning beginning position to be approximately the same. For this purpose, it is necessary to cause the optical characteristics of the scanning and imaging optical systems 18A through 18D at the adjacent portions directing the respective light fluxes 20d and 20b to the adjacent scanning end position and scanning beginning position to approximate one another.

In order to reduce the difference between the diameter of beam spot of the optical scanning unit of the adjacent optical scanning units 201A through 201D scanning the surface 9 to be scanned at the scanning end position and the diameter of beam spot of the optical scanning unit of the adjacent optical scanning units 201A through 201D scanning the surface 9 to be scanned subsequently at the scanning beginning position, the respective scanning and imaging optical systems 18D through 18D are configured to satisfy the following expression (1):

$$(Bn(-)-<B>) \times (Bn+1(+)-<B>) \geq 0 \quad (1)$$

where:
- m: the total number of the optical scanning units;
- n: any integer in the range of $1 \leq n \leq m-1$;
- Bn(−): the diameter of beam spot of the n-th optical scanning unit at the scanning end position;
- Bn+1(+): the diameter of beam spot of the (n+1)-th optical scanning unit at the scanning beginning position; and
- <B>: the average of the diameters of beam spots of the optical scanning units scanning the surface to be scanned.

When the respective scanning and imaging optical systems 18A through 18D do not satisfy the above expression (1), that is, the respective scanning and imaging optical systems 18A through 18D satisfy the following expression (2), discontinuity of density occurs at the joined portions of the light fluxes 20 on the surface 9 to be scanned directed by the respective scanning and imaging units 18A through 18D, and, as a result, lines of density difference are generated at the joins:

$$(Bn(-)-<B>) \times (Bn+1(+)-<B>) < 0 \quad (2)$$

Further, because change in diameter of beam spot at the joins is preferably small to the utmost, it is preferable that the respective scanning and imaging optical systems 18A through 18D also satisfy the following expression (3) expressing the inclination of change of the expression (1):

$$\{d(Bn(-)-<B>)/dy\} \times \{d(Bn+1(+)-<B>)/dy\} \geq 0 \quad (3)$$

where y: length in main scanning direction.

As a result of the above-mentioned expressions (1) and (3) being satisfied, the first embodiment is not likely to generate lines of density difference and/or the like at the joins only as a result of the microprocessor or the like not shown in the figure precisely controlling switching of the outputs of the respective optical scanning units.

Figure 3A:
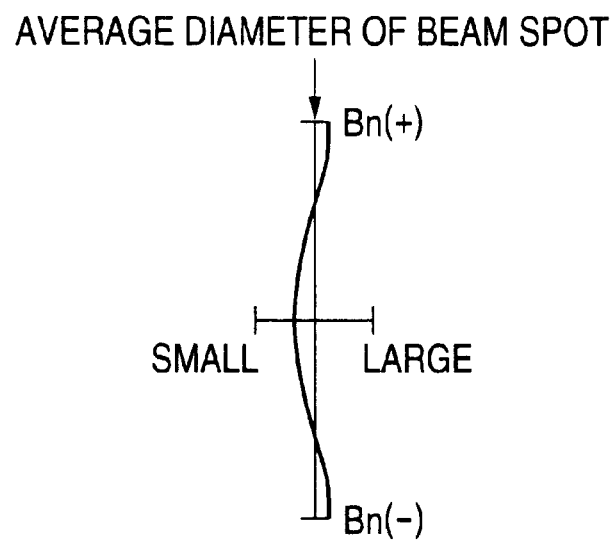
FIGS. 3A and 3B show a diameter of beam spot in the optical scanning device in the first embodiment of the present invention.
Figure 3B:
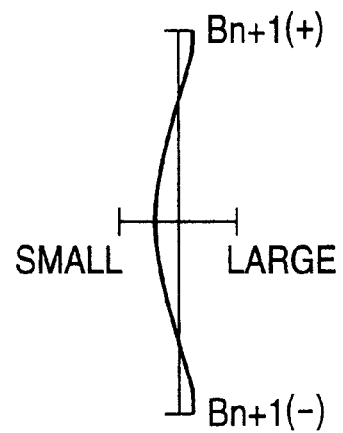

FIGS. 3A and 3B show relationship between the diameter of beam spot and image height. In the figures, (+) denotes the scanning beginning position and (−) denotes the scanning end position. FIG. 3A relates to the n-th optical scanning unit and FIG. 3B relates the (n+1)-th optical scanning unit.

Second and third embodiments of the present invention will now be described.

Figure 4:
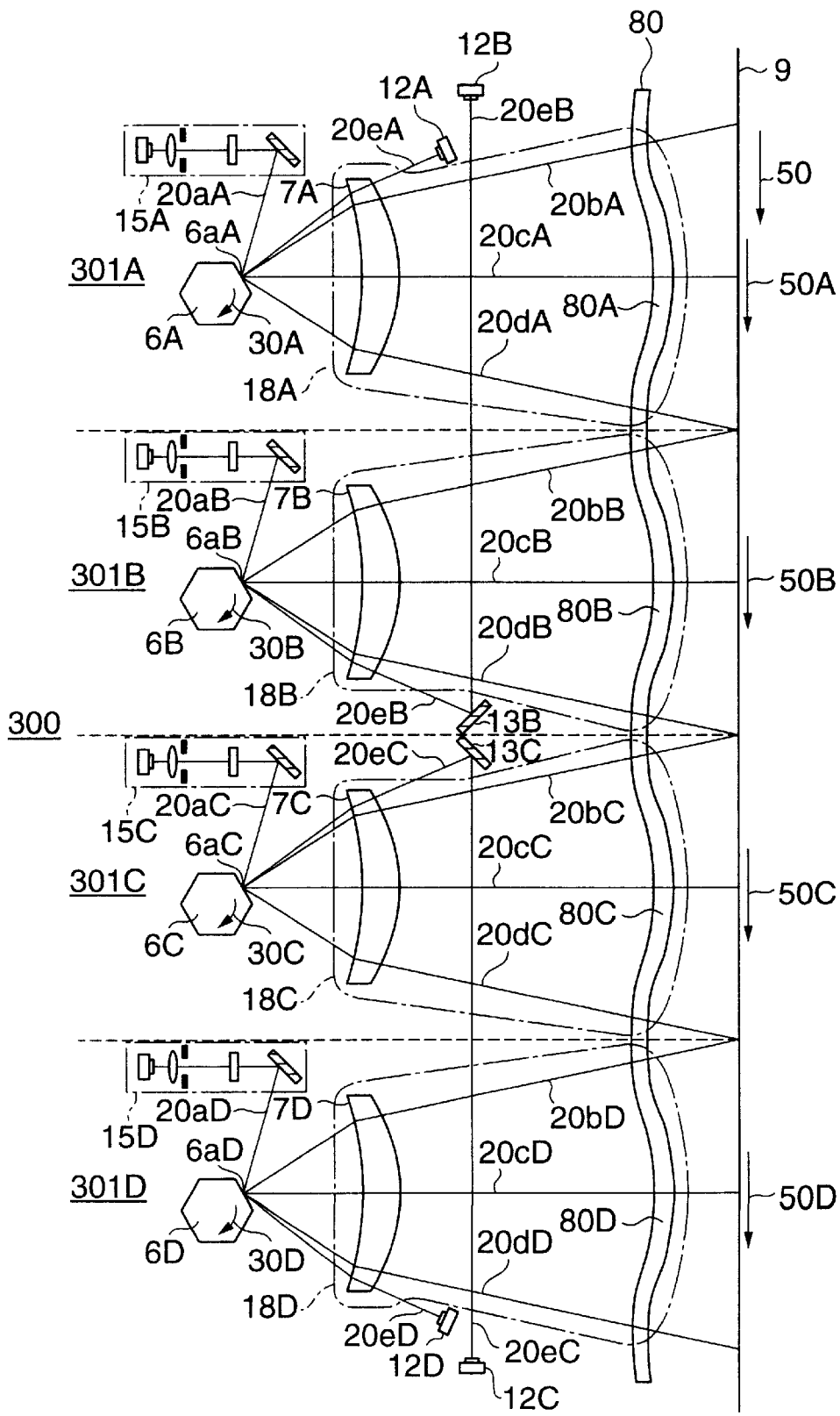
FIG. 4 shows a configuration of an optical scanning device in a second embodiment of the present invention.
Figure 5:
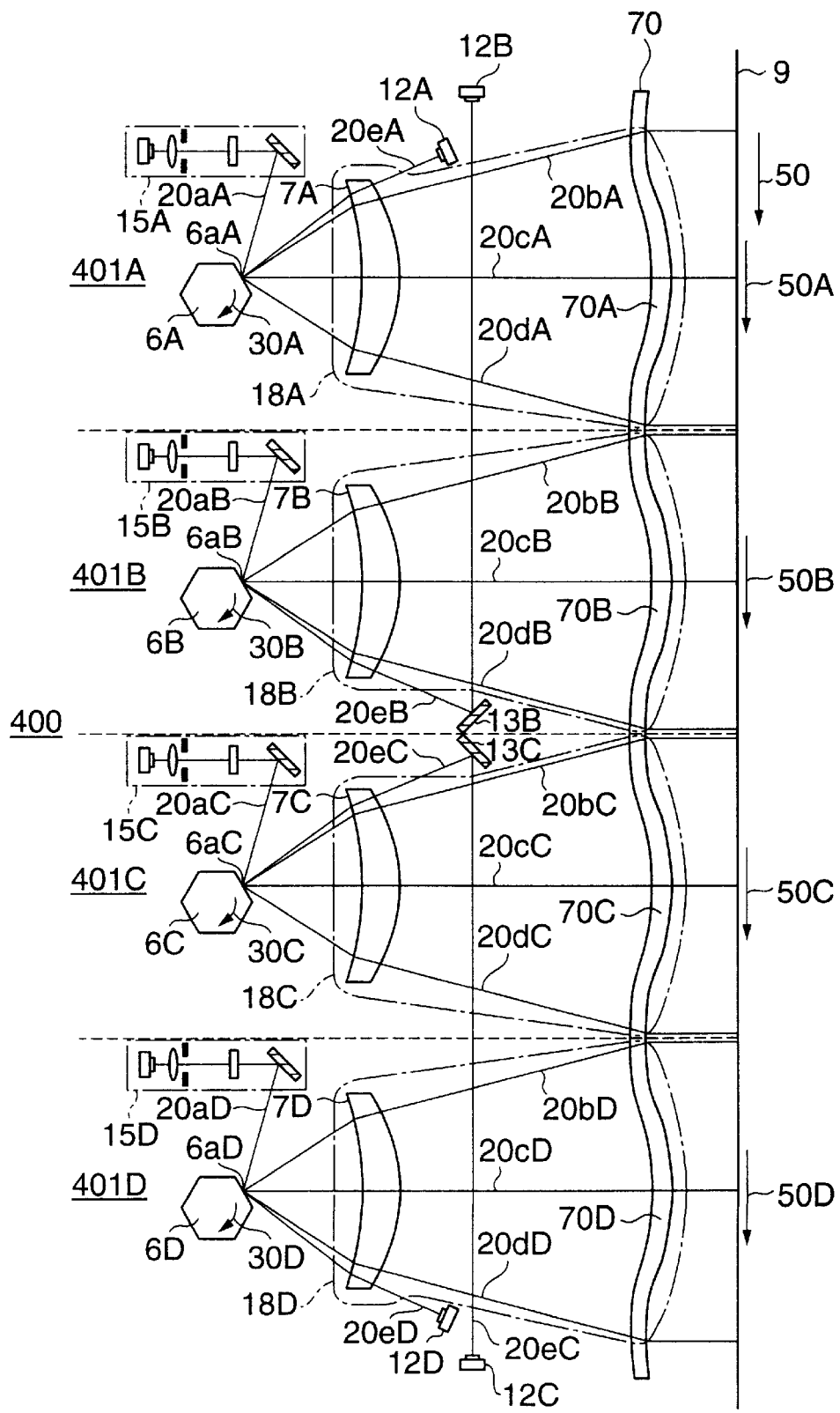
FIG. 5 shows a configuration of an optical scanning device in a third embodiment of the present invention.

FIG. 4 shows a configuration of an optical scanning device in the second embodiment of the present invention, and FIG. 5 shows a configuration of an optical scanning device in the third embodiment of the present invention.

The difference between the configuration of the optical scanning device 300 in the second embodiment shown in FIG. 4 and the configuration of the optical scanning device 400 in the third embodiment shown in FIG. 5 is only as follows: The optical scanning device 300 uses non-telecentric optical systems while the optical scanning device 400 uses approximately telecentric optical systems. As a result, the light paths of the respective scanning and imaging optical systems 18A through 18D are different between the second and third embodiments.

The difference between the optical scanning device 300 in the second embodiment or the optical scanning device 400 in the third embodiment and the optical scanning device 200 in the first embodiment is as follows: Synchronization detecting light paths for at least one (two in these embodiments) of the optical scanning unit 301A through 301D or 401A through 401D is provided between the light path 20d of the scanning and imaging optical system 18 of one of the optical scanning units 301A through 301D or 401A through 401D and the light path 20b of the scanning and imaging optical system 18 of the other adjacent optical scanning device, and, also, mirrors 13B, 13C directing the light fluxes 20eB, 20eC of the synchronization detecting light paths to the outside of the light paths of the respective scanning and imaging optical systems 18A through 18D or synchronization detecting sensors 12B, 12C detecting the light fluxes 20eB, 20eC of the synchronization detecting light paths are provided there.

For example, as in the optical scanning units 301B, 301C disposed between the other optical scanning units 301A and 301D, no component can be disposed between the light paths 20bB and 20dB and between the light paths 20bC and 20dC because these spaces are used for scanning by the respective light fluxes. Accordingly, the places where the synchronization detecting units 12B, 12C for detecting synchronization of the deflectors 6B, 6C are disposed are limited to the narrow space between the light flux 20dB and light flux 20bC, the narrow space between the light flux 20dA and light flux 20bB or the narrow space between the light flux 20dC and light flux 20bD.

In a recent optical scanning device, due to demand for miniaturization, there is a case where other components are already closely disposed in the above-mentioned narrow spaces. In such a case, it is not possible to dispose the relatively large synchronization sensors 12B, 12C or the like there.

In order to solve this problem, in the second and third embodiments, as shown in FIGS. 4 and 5, the mirrors 13B and 13D which do not require a large space are disposed between the light flux 20dB and light flux 20bC, and the synchronization detecting sensors 13B, 13D are disposed in the outside of the spaces for scanning by the respective light fluxes, as shown in the figures.

Figure 7:
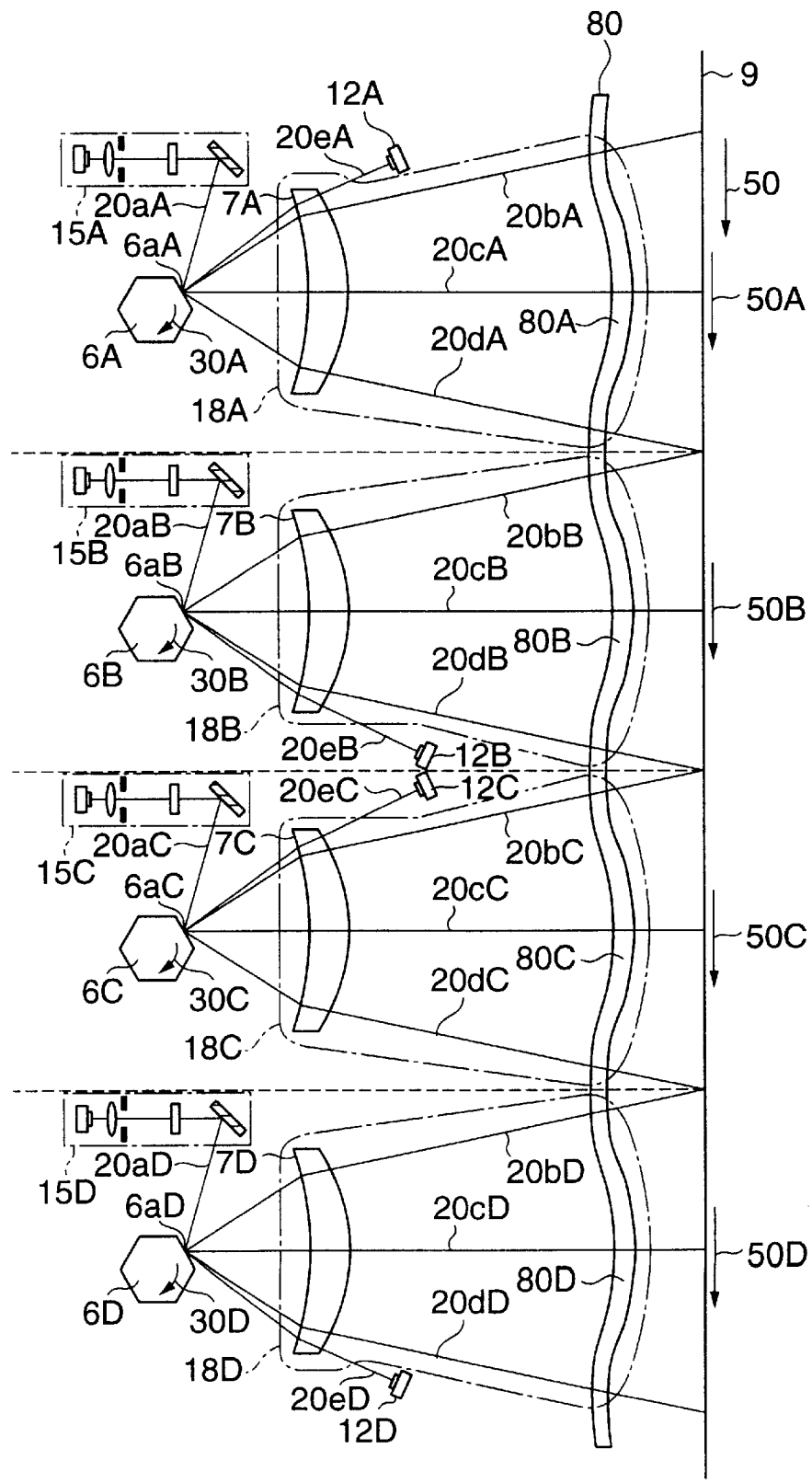
FIG. 7 shows a configuration of an optical scanning device in a first variant embodiment of the second embodiment of the present invention.
Figure 8:
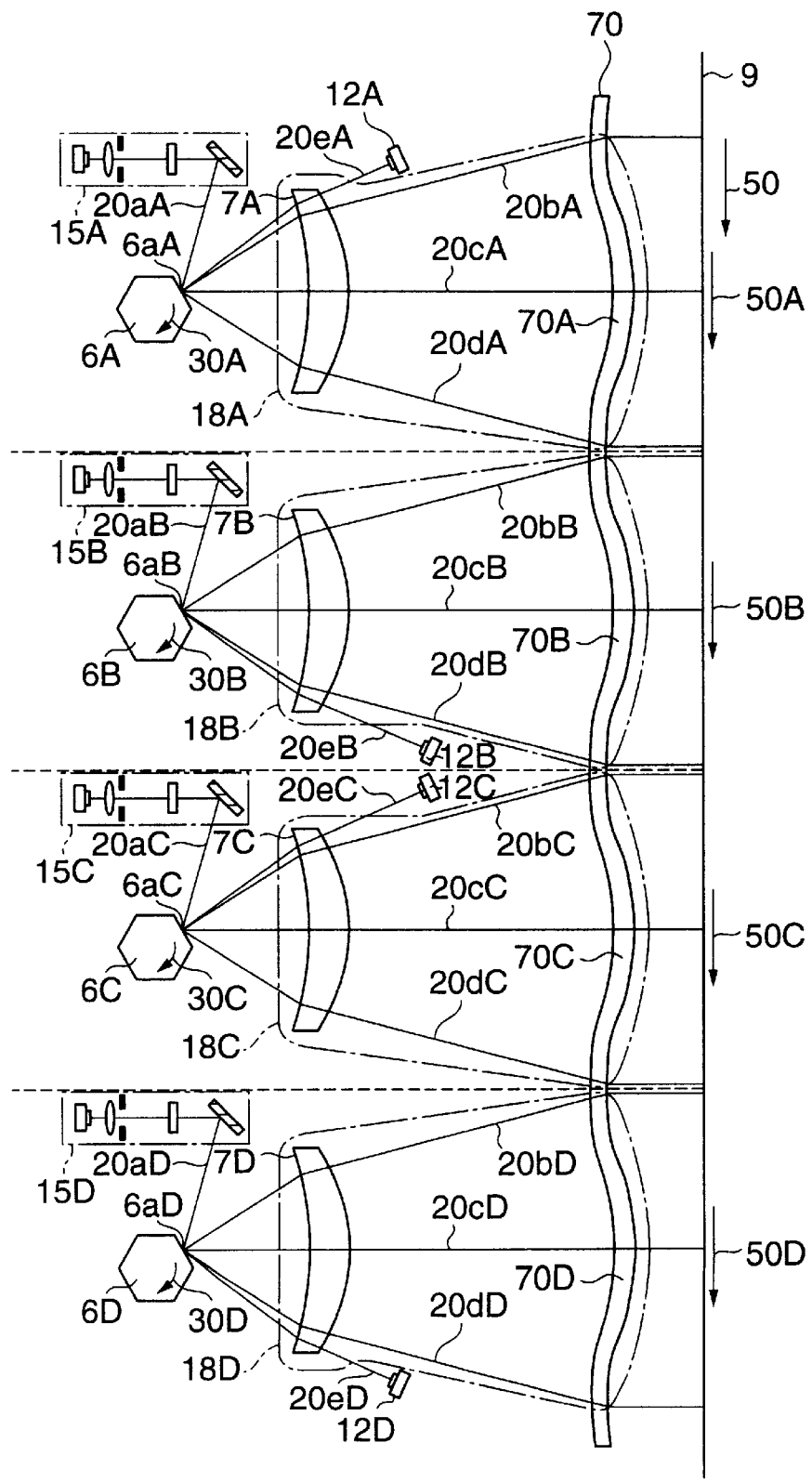
FIG. 8 shows a configuration of an optical scanning device in a first variant embodiment of the third embodiment of the present invention.

However, when there is a sufficient space between the light fluxes 20dB and 20bC, or the synchronization detecting sensors 12B, 12C are relatively small-sized ones, the synchronization detecting sensors 12B, 12C may be disposed there instead of the mirrors 13B, 13C in FIGS. 4 and 5 (as in the embodiments shown in FIGS. 7 and 8).

It is noted that the position of the light path for the synchronization detection for each one of the optical scanning units 301A through 301D or 401A through 401D may be slightly outside of the scanning beginning end of the effective scanning range of the deflector 6 or may be slightly outside of the scanning completion end of the effective scanning range of the deflector 6.

Thus, in each of the second and third embodiment, it is possible to minmiaturize the opitcal scanning device, to make easier adjustment in manufacturing it, and, also, to precisely detect synchronization of deflectors even in the optical scanning device employing more than two optical scanning units.

A fourth embodiment of the present invention will now be described.

Figure 6:
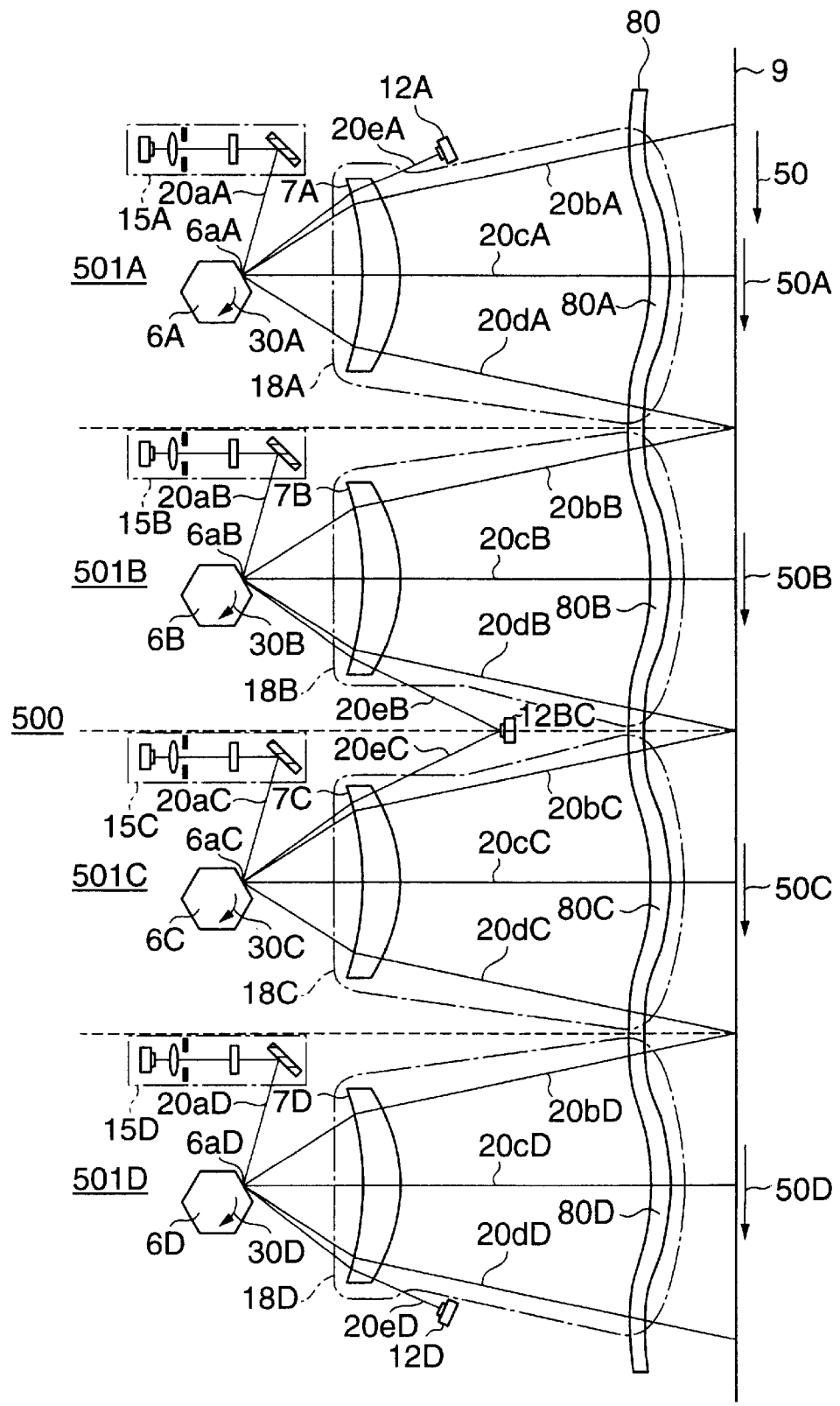
FIG. 6 shows a configuration of an optical scanning device in a fourth embodiment of the present invention.

FIG. 6 shows a configuration of an optical scanning device in the fourth embodiment employing non-telecentric optical systems.

The difference between the optical scanning device 500 in the fourth embodiment and each of the optical scanning devices 300 and 400 in the second and third embodiments shown in FIGS. 4 and 5 is that a single synchronization detecting sensor 12BC is used for the two light fluxes 20eB, 20eC for the synchronization detection instead of the mirrors 13B, 13C and synchronization detecting sensors 12B, 12C.

Accordingly, in the fourth embodiment, it is possible to minmiaturize the opitcal scanning device, to make easier adjustment in manufacturing it, to precisely detect synchronization of deflectors even in the optical scanning device employing more than two optical scanning units, and, also, to reduce the space, thus improving the space utilization efficiency. Further, in comparison to the case where the synchronization detecting sensors are provided for the light fluxes for synchronization detection, respectively, it is possible to reduce the influence of the variation in characteristics of the respective synchronization detecting sensors. Further, because it is possible to reduce the number of synchronization detecting sensors, it is possible to reduce the cost.

FIG. 7 shows a configuration of an optical scanning device in a first variant embodiment of the above-described second embodiment of the present invention shown in FIG. 4.

The difference between the first variant embodiment of the second embodiment and the second embodiment is that the mirrors 13B, 13C in the second embodiment are replaced by the synchronization detecting sensors 12B, 12C in the first variant embodiment of the second embodiment.

FIG. 8 shows a configuration of an optical scanning device in a first variant embodiment of the above-described third embodiment of the present invention shown in FIG. 5.

The difference between the first variant embodiment of the third embodiment and the third embodiment is that the mirrors 13B, 13C in the third embodiment are replaced by the synchronization detecting sensors 12B, 12C in the first variant embodiment of the third embodiment.

Figure 9:
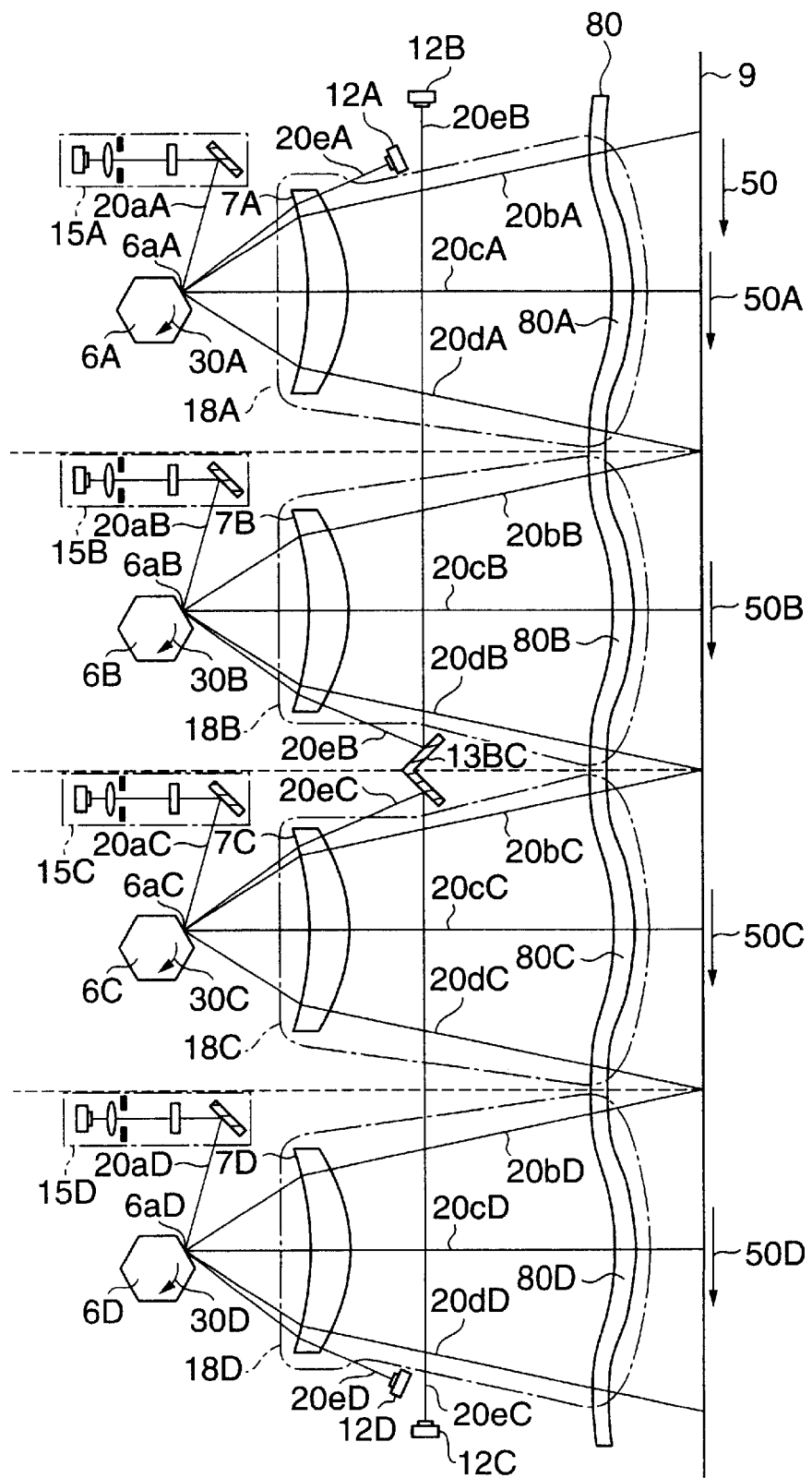
FIG. 9 shows a configuration of an optical scanning device in a second variant embodiment of the second embodiment of the present invention.

FIG. 9 shows a configuration of an optical scanning device in a second variant embodiment of the above-described second embodiment of the present invention shown in FIG. 4.

The difference between the second variant embodiment of the second embodiment and the second embodiment is that the mirrors 13B, 13C in the second embodiment are replaced by a single mirror 13BC in the second variant embodiment of the second embodiment.

Figure 10:
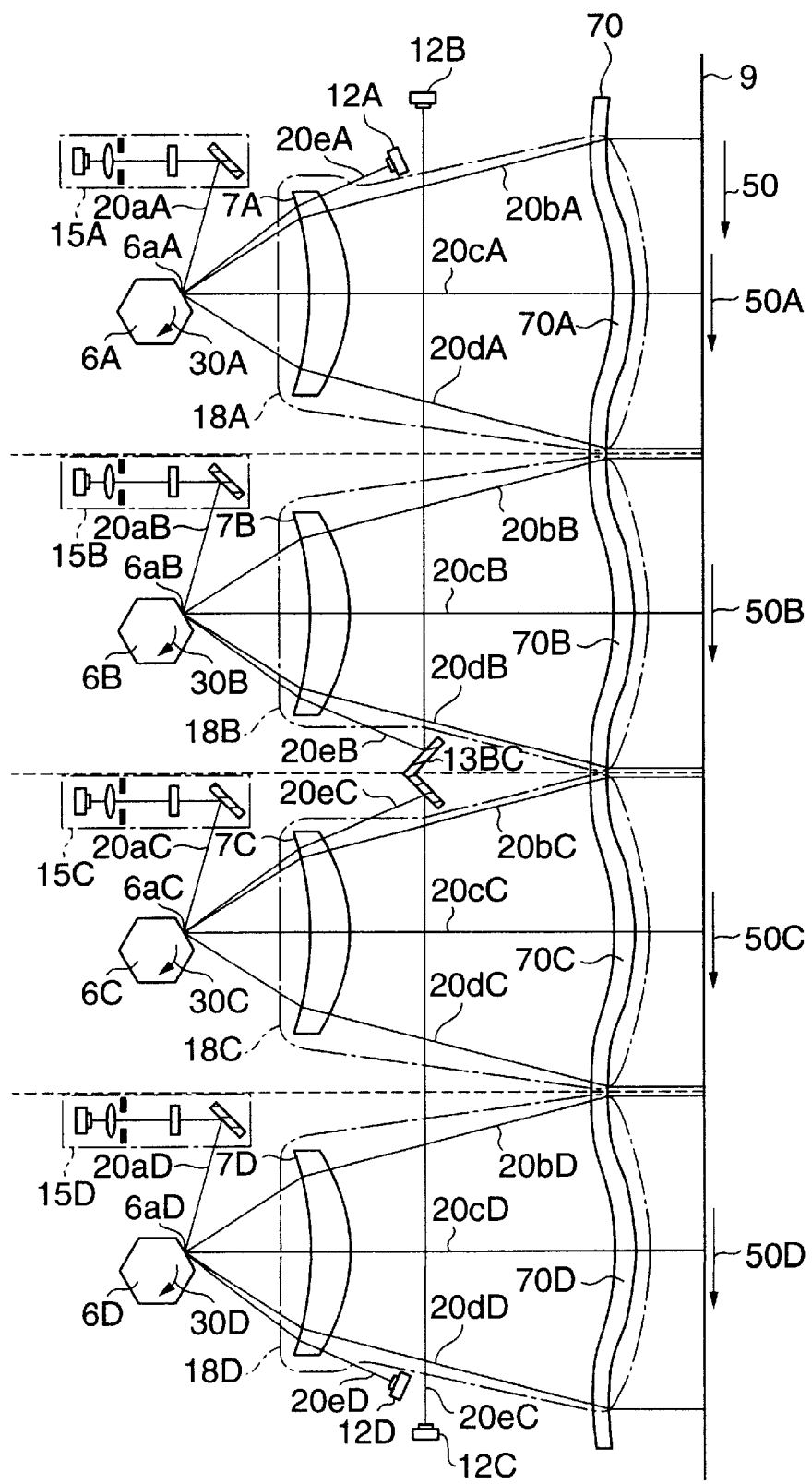
FIG. 10 shows a configuration of an optical scanning device in a second variant embodiment of the third embodiment of the present invention.

FIG. 10 shows a configuration of an optical scanning device in a second variant embodiment of the above-described third embodiment of the present invention shown in FIG. 5.

The difference between the second variant embodiment of the third embodiment and the third embodiment is that the mirrors 13B, 13C in the third embodiment are replaced by a single mirror 13BC in the second variant embodiment of the third embodiment.

Figure 11:
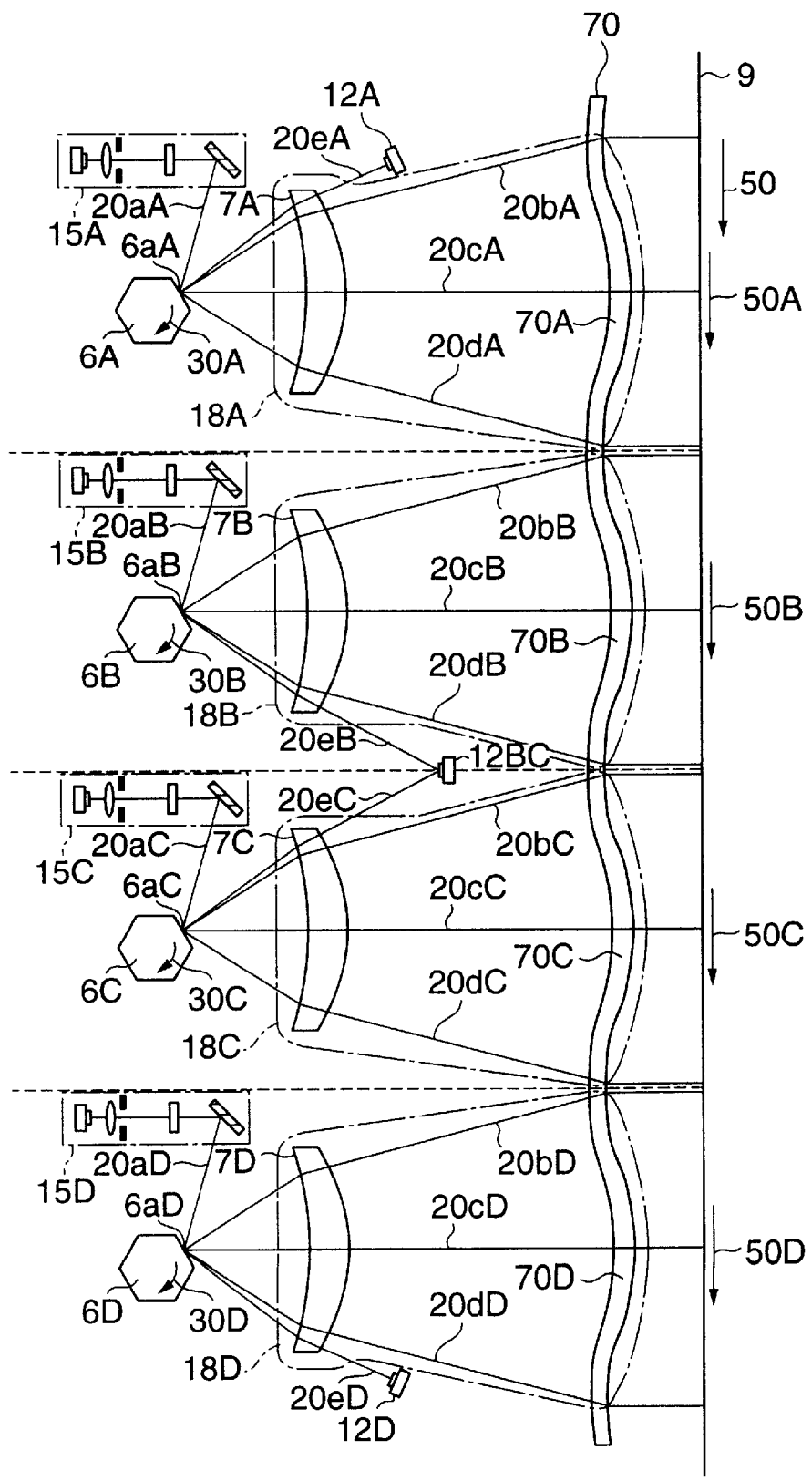
FIG. 11 shows a configuration of an optical scanning device in a first variant embodiment of the fourth embodiment of the present invention.

FIG. 11 shows a configuration of an optical scanning device in a first variant embodiment of the above-described fourth embodiment of the present invention shown in FIG. 6.

The difference between the first variant embodiment of the fourth embodiment and the fourth embodiment is that the optical scanning device in the fourth embodiment uses non-telecentric optical systems while the optical scanning device in the first variant embodiment of the fourth embodiment instead uses approximately telecentric optical systems. As a result, the light paths of the respective scanning and imaging optical systems 18A through 18D are different between the fourth embodiment and the first variant embodiment of the fourth embodiment.

Figure 12:
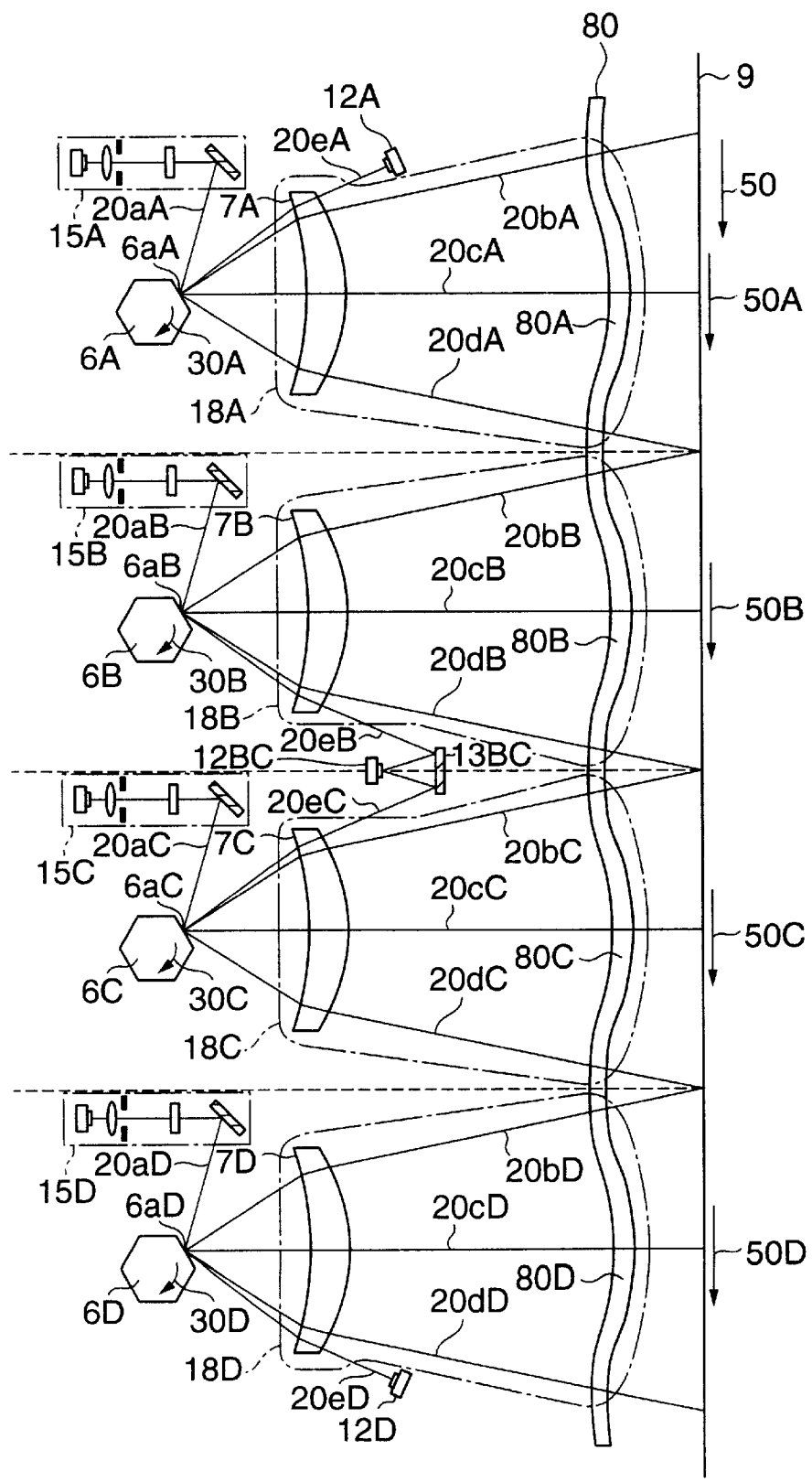
FIG. 12 shows a configuration of an optical scanning device in a second variant embodiment of the fourth embodiment of the present invention.

FIG. 12 shows a configuration of an optical scanning device in a second variant embodiment of the above-described fourth embodiment of the present invention shown in FIG. 6.

The difference between the second variant embodiment of the fourth embodiment and the fourth embodiment is that the synchronization detecting sensor 12BC in the fourth embodiment is replaced by a mirror 13BC, and the synchronization detecting sensor 12BC is disposed in another place to which the light fluxes reflected by the mirror 13BC is directed in the second variant embodiment of the fourth embodiment.

Figure 13:
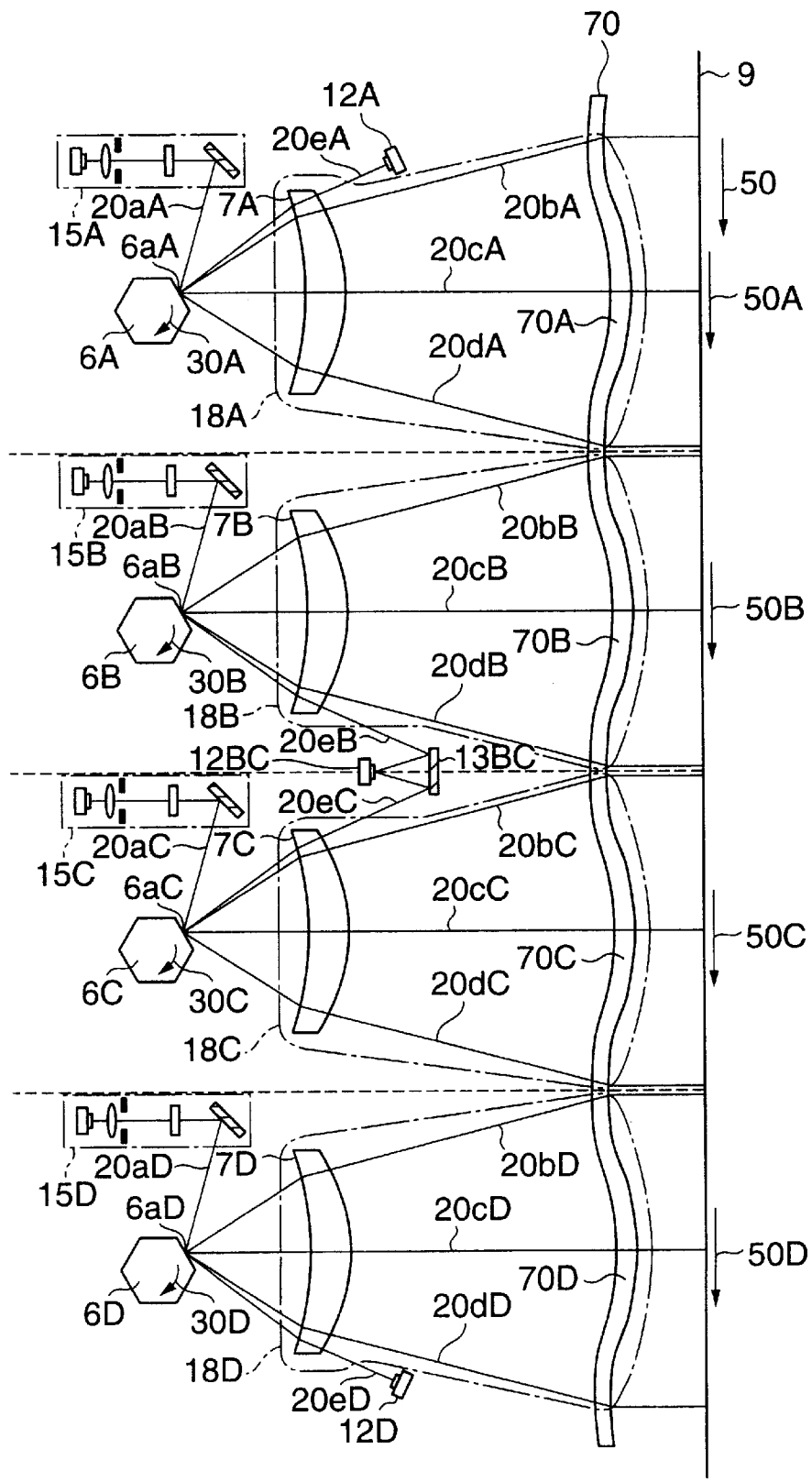
FIG. 13 shows a configuration of an optical scanning device in a third variant embodiment of the fourth embodiment of the present invention.

FIG. 13 shows a configuration of an optical scanning device in a third variant embodiment of the above-described fourth embodiment of the present invention shown in FIG. 6.

The difference between the third variant embodiment of the fourth embodiment and the first variant embodiment of the fourth embodiment shown in FIG. 11 is that the synchronization detecting sensor 12BC in the first variant embodiment of the fourth embodiment is replaced by the mirror 13BC, and the synchronization detecting sensor 12BC is disposed in another place to which the light fluxes reflected by the mirror 13BC is directed in the third variant embodiment of the fourth embodiment.

The present invention is not limited to the above-described embodiments, and variations and modifications may be made without departing from the scope of the present invention.

The present application is based on Japanese priority application No. 11-269230, filed on Sep. 22, 1999, the entire contents of which are hereby incorporated by reference.

What is claimed is:

1. An optical scanning device comprising:
    a plurality of optical scanning units, each of said units including,
    a light source configured to emit a light flux,
    a scanning input optical system configured to direct the light flux emitted from the light source to a deflector,
    said deflector configured to deflect the light flux so as to cause the light flux to scan a single surface, and
    a scanning and imaging optical system configured to condense the light flux deflected by said deflector so as to form a beam spot thereof on said single surface to be escanned,
    said single surface to be scanned is scanned in a manner such that the plurality of optical scanning units scan respective different divisions of said single surface,
    wherein said optical scanning device scans said single surface to be scanned continuously through coordinated movements of said plurality of optical scanning units, and the respective scanning and imaging optical systems of adjacent at least two of said plurality of optical scanning units have one lens in common.

2. The optical scanning device as claimed in claim 1, wherein said lens which said respective scanning and imaging optical systems have in common comprises a plastic lens.

3. An optical scanning device comprising:

a plurality of optical scanning units, each of said units including, a light source configured to emit a light flux, a scanning input optical system configured to direct the light flux emitted from the light source to a deflector, said deflector configured to deflect the light flux for causing the light flux to scan a surface to be scanned; and a scanning and imaging optical system configured to condense the light flux deflected by said deflector so as to form a beam spot thereof on said surface to be scanned, wherein said optical scanning device scans said surface to be scanned continuously through coordinated movements of said plurality of optical scanning units, and in order to reduce a difference between a diameter of a beam spot at a scanning end position of an optical scanning unit of said plurality of optical scanning units scanning said surface to be scanned and a diameter of a beam spot at a scanning beginning position of another optical scanning unit of said plurality of optical scanning units scanning said surface to be scanned subsequently, the respective scanning and imaging optical systems of said plurality of optical scanning units are configured to satisfy the following expression (1):

$$(Bn(-)-<B>) \times (Bn+1(+)-<B>) \geq 0 \qquad (1)$$

where m is the total number of said plurality of optical scanning units, n is any integer in the range of $1 \leq n \leq m-1$, $Bn(-)$ is a diameter of a beam spot at the scanning end position of an n-th optical scanning unit of said plurality of optical scanning units, $Bn+1(+)$ is a diameter of a beam spot at the scanning beginning position of an (n+1)-th optical scanning unit of said plurality of optical scanning units, and $<B>$ is an average of diameters of beam spots of said plurality of optical scanning units scanning said surface to be scanned.

4. The optical scanning device as claimed in claim 1, wherein said scanning and imaging optical system is approximately telecentric in main scanning direction.

5. The optical scanning device as claimed in claim 3, wherein said scanning and imaging optical system is approximately telecentric in main scanning direction.

6. An optical scanning device comprising:

a plurality of optical scanning units, each of said units including, a light source configured to emit a light flux, a scanning input optical system configured to direct the light flux emitted from the light source to a deflector, said deflector configured to deflect the light flux so as to cause the light flux to scan a single surface, and a scanning and imaging optical system configured to condense the light flux deflected by said deflector so as to form a beam spot thereof on said single surface to be scanned, said single surface to be scanned is scanned in a manner such that the plurality of optical scanning units scan respective different divisions of said single surface, wherein said optical scanning device scans said single surface to be scanned continuously through coordinated movements of said plurality of optical scanning units, and a synchronization detecting light path for at least one optical scanning unit of said plurality of optical scanning units is provided between light paths of the respective scanning and imaging optical systems of adjacent two optical scanning units of said plurality of optical scanning units, and, also, a light directing part directing a light flux of said synchronization detecting light path to the outside of said light paths of said respective scanning and imaging optical systems is provided there, and the respective scanning and imaging optical systems of adjacent at least two of said plurality of optical scanning units have one lens in common.

7. An optical scanning device comprising:

a plurality of optical scanning units, each of said units including, a light source configured to emit a light flux, a scanning input optical system configured to direct the light flux emitted from the light source to a deflector, said deflector configured to deflect the light flux so as to cause the light flux to scan a single surface, and a scanning and imaging optical system configured to condense the light flux deflected by said deflector so as to form a beam spot thereof on said single surface to be scanned, said single surface to be scanned is scanned in a manner such that the plurality of optical scanning units scan respective different divisions of said single surface, wherein said optical scanning device scans said single surface to be scanned continuously through coordinated movements of said plurality of optical scanning units, and a synchronization detecting light path for at least one optical scanning unit of said plurality of optical scanning units is provided between light paths of the respective scanning and imaging optical systems of adjacent two optical scanning units of said plurality of optical scanning units, and, also, a synchronization detecting part detecting a light flux of said synchronization detecting light path is provided there, and the respective scanning and imaging optical systems of adjacent at least two of said plurality of optical scanning units have one lens in common.

8. The optical scanning device as claimed in claim 6, wherein, when said synchronization detecting light path comprises a plurality of synchronization detecting light paths, the single light directing part is configured to direct said plurality of synchronization detecting light paths.

9. The optical scanning device as claimed in claim 7, wherein, when said synchronization detecting light path comprises a plurality of synchronization detecting light paths, the single synchronization detecting part is configured to detect light fluxes of said plurality of synchronization detecting light paths.

10. The optical scanning device as claimed in claim 6, wherein the respective scanning and imaging optical systems of adjacent at least two of said plurality of optical scanning units have one lens in common.

11. The optical scanning device as claimed in claim 10, wherein said lens which said respective scanning and imaging optical systems have in common comprises a plastic lens.

12. An optical scanning device comprising:

a plurality of optical scanning units, each of said units including, a light source configured to emit a light flux, a scanning input optical system configured to direct the light flux emitted from the light source to a deflector, said deflector configured to deflect the light flux so as to cause the light flux to scan a surface, and a scanning and imaging optical system configured to condense the light flux deflected by said deflector so as to form a beam spot thereof on said surface to be scanned, wherein said optical scanning device scans said surface to be scanned continuously through coordinated movements of said plurality of optical scanning units, and a synchronization detecting light path for at least one optical scanning unit of said plurality of optical scanning units is provided between light paths of the respective scanning and imaging optical systems of adjacent two optical scanning units of said plurality of optical scanning units, and, also, a light directing part directing a light flux of said synchronization detecting light path to the outside of said light paths of said respective scanning and imaging optical systems is provided between the light paths, wherein in order to reduce a difference between a diameter of a beam spot at a scanning end position of an optical scanning unit of said plurality of optical scanning units scanning said surface to be scanned and a diameter of a beam spot at a scanning beginning position of another optical scanning unit of said plurality of optical scanning units scanning said surface to be scanned subsequently, the respective scanning and imaging optical systems of said plurality of optical scanning units are configured to satisfy the following expression (1):

$$(Bn(-)-<B>) \times (Bn+1(+)-<B>) \geq 0 \quad (1)$$

where m is the total number of said plurality of optical scanning units, n is any integer in the range of $1 \leq n \leq m-1$, $Bn(-)$ is a diameter of a beam spot at the scanning end position of an n-th optical scanning unit of said plurality of optical scanning units, $Bn+1(+)$ is a diameter of a beam spot at the scanning beginning position of an (n+1)-th optical scanning unit of said plurality of optical scanning units, and $<B>$ is an average of diameters of beam spots of said plurality of optical scanning units scanning said surface to be scanned.

13. The optical scanning device as claimed in claim 10, wherein said scanning and imaging optical system is approximately telecentric in main scanning direction.

14. The optical scanning device as claimed in claim 12, wherein said scanning and imaging optical system is approximately telecentric in main scanning direction.

15. The optical scanning device as claimed in claim 7, wherein the respective scanning and imaging optical systems of adjacent at least two of said plurality of optical scanning units have one lens in common.

16. The optical scanning device as claimed in claim 15, wherein said lens which said respective scanning and imaging optical systems have in common comprises a plastic lens.

17. An optical scanning device comprising:

a plurality of optical scanning units, each of said units including, a light source, configured to emit a light flux, a scanning input optical system configured to direct the light flux emitted from the light source to a deflector, said deflector configured to deflect the light flux so as to cause the light flux to scan a surface, and a scanning and imaging optical system configured to condense the light flux deflected by said deflector so as to form a beam spot thereof on said surface to be scanned, wherein said optical scanning device scans said surface to be scanned continuously through coordinated movements of said plurality of optical scanning units, a synchronization detecting light path for at least one optical scanning unit of said plurality of optical scanning units is provided between light paths of the respective scanning and imaging optical systems of adjacent two optical scanning units of said plurality of optical scanning units, and, also, a synchronization detecting part detecting a light flux of said synchronization detecting light path is provided there, and in order to reduce a difference between a diameter of a beam spot at a scanning end position of an optical scanning unit of said plurality of optical scanning units scanning said surface to be scanned and a diameter of a beam spot at a scanning beginning position of another optical scanning unit of said plurality of optical scanning units scanning said surface to be scanned subsequently, the respective scanning and imaging optical systems of said plurality of optical scanning units satisfy the following expression (1):

$$(Bn(-)-<B>) \times (Bn+1(+)-<B>) \geq 0 \quad (1)$$

where m is the total number of said plurality of optical scanning units, n is any integer in the range of $1 \leq n \leq m-1$, $Bn(-)$ is a diameter of a beam spot at the scanning end position of an n-th optical scanning unit of said plurality of optical scanning units, $Bn+1(+)$ is a diameter of a beam spot at the scanning beginning position of an (n+1)-th optical scanning unit of said plurality of optical scanning units, and $<B>$ is an average of diameters of beam spots of said plurality of optical scanning units scanning said surface to be scanned.

18. The optical scanning device as claimed in claim 15, wherein said scanning and imaging optical system is approximately telecentric in main scanning direction.

19. The optical scanning device as claimed in claim 17, wherein said scanning and imaging optical system is approximately telecentric in main scanning direction.

* * * * *